(12) United States Patent
Schiff

(10) Patent No.: US 12,363,100 B2
(45) Date of Patent: Jul. 15, 2025

(54) LOCATION BASED MOBILE DEVICE LINKING SYSTEM USING SHORT LINK CODES

(71) Applicant: Swave Holdings Corporation, Westlake Village, CA (US)

(72) Inventor: Michael Aron Schiff, Thousand Oaks, CA (US)

(73) Assignee: SWAVE HOLDINGS, CORPORATION, Westlake Village, CA (US)

( * ) Notice: Subject to any disclaimer, the term of this patent is extended or adjusted under 35 U.S.C. 154(b) by 0 days.

(21) Appl. No.: 16/415,968

(22) Filed: May 17, 2019

(65) Prior Publication Data

US 2020/0112558 A1    Apr. 9, 2020

Related U.S. Application Data

(63) Continuation of application No. 14/298,729, filed on Jun. 6, 2014, now abandoned.

(60) Provisional application No. 61/833,037, filed on Jun. 10, 2013.

(51) Int. Cl.
| | | |
|---|---|---|
| *H04W 4/02* | (2018.01) | |
| *G06F 21/35* | (2013.01) | |
| *G06F 21/36* | (2013.01) | |
| *G06F 21/62* | (2013.01) | |
| *G06Q 10/10* | (2023.01) | |
| *H04L 9/40* | (2022.01) | |
| *H04W 4/21* | (2018.01) | |
| *H04W 12/06* | (2021.01) | |
| *H04L 67/52* | (2022.01) | |
| *H04W 4/029* | (2018.01) | |

(52) U.S. Cl.
CPC .......... *H04L 63/0838* (2013.01); *G06F 21/35* (2013.01); *G06F 21/36* (2013.01); *G06F 21/6263* (2013.01); *G06Q 10/10* (2013.01); *H04W 4/21* (2018.02); *H04W 12/06* (2013.01); *H04L 67/52* (2022.05); *H04W 4/029* (2018.02)

(58) Field of Classification Search
CPC ....... H04W 4/02; H04W 4/028; H04W 12/02; H04W 4/023; H04W 4/08; H04W 4/206; H04W 84/10; H04W 8/26; H04L 67/18; H04L 51/20; H04L 51/32; H04L 63/0421
See application file for complete search history.

(56) References Cited

U.S. PATENT DOCUMENTS

| | | | | |
|---|---|---|---|---|
| 8,301,174 B2 * | 10/2012 | An | ..................... | H04M 1/72572 455/39 |
| 8,797,138 B2 * | 8/2014 | Myers | ................. | G07C 9/00571 340/5.7 |
| 9,066,326 B2 * | 6/2015 | Narayan | ................ | H04W 12/50 |
| 9,071,579 B1 * | 6/2015 | Bender | ................ | H04L 63/0428 |

(Continued)

*Primary Examiner* — Liton Miah
(74) *Attorney, Agent, or Firm* — FisherBroyles, LLP

(57) ABSTRACT

A networking system utilizes a mobile device which communicates through a host server that identifies the location of a user's device and allows users to easily connect anonymously on their mobile devices over a data network through the host server with other people, businesses, websites and informational pages by simply inputting or saying out loud a short code into their mobile device when the user is within a certain radius of the code they see posted and/or advertised, or, by way of example, flashed at them by another user.

11 Claims, 6 Drawing Sheets

(56) References Cited

U.S. PATENT DOCUMENTS

| | | | | |
|---|---|---|---|---|
| 2007/0201389 A1* | 8/2007 | Murayama | H04W 76/11 | 370/310 |
| 2009/0088076 A1* | 4/2009 | Mercurio | H04W 12/003 | 455/41.2 |
| 2009/0209202 A1* | 8/2009 | Martini | H04W 12/02 | 455/41.2 |
| 2010/0094554 A1* | 4/2010 | Orrell, Jr. | G01S 19/06 | 701/472 |
| 2010/0176919 A1* | 7/2010 | Myers | G07C 9/00571 | 340/5.73 |
| 2012/0322384 A1* | 12/2012 | Zerr | H04W 8/18 | 455/41.3 |
| 2014/0159993 A1* | 6/2014 | McGie | G06F 3/1438 | 345/2.3 |

* cited by examiner

LOCATION BASED MOBILE DEVICE LINKING SYSTEM USING SHORT LINK CODES

CROSS REFERENCE TO RELATED APPLICATIONS

The present application is a continuation of and claims priority from U.S. application Ser. No. 14/298,729 filed Jun. 6, 2014, which claims priority from U.S. Provisional Application No. 61/833,037, filed Jun. 10, 2013. The above applications are incorporated by reference in their entireties as if fully set forth herein.

FIELD OF THE INVENTION

This disclosure relates generally to communication systems and more particularly to communication systems for mobile devices.

BACKGROUND OF THE INVENTION

There are social networking applications designed for use on a mobile device; many of them are designed to utilize the location of the users or members, such as those in PCT/US2007/066820 (WO2007127643A2) or PCT/US2009/049956 (WO2010006062A1). These methods require the users or members to already be connected to each other through a social networking system (such as Facebook®), or they attempt to match users with one another based on similar interests or mutual friends, and notify users when they are in close proximity to other users, friends or members. These methods may be useful as a match-making system or a notification system of nearby friends or members; however they do not provide a method for strangers to spontaneously meet one another after making visual contact.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
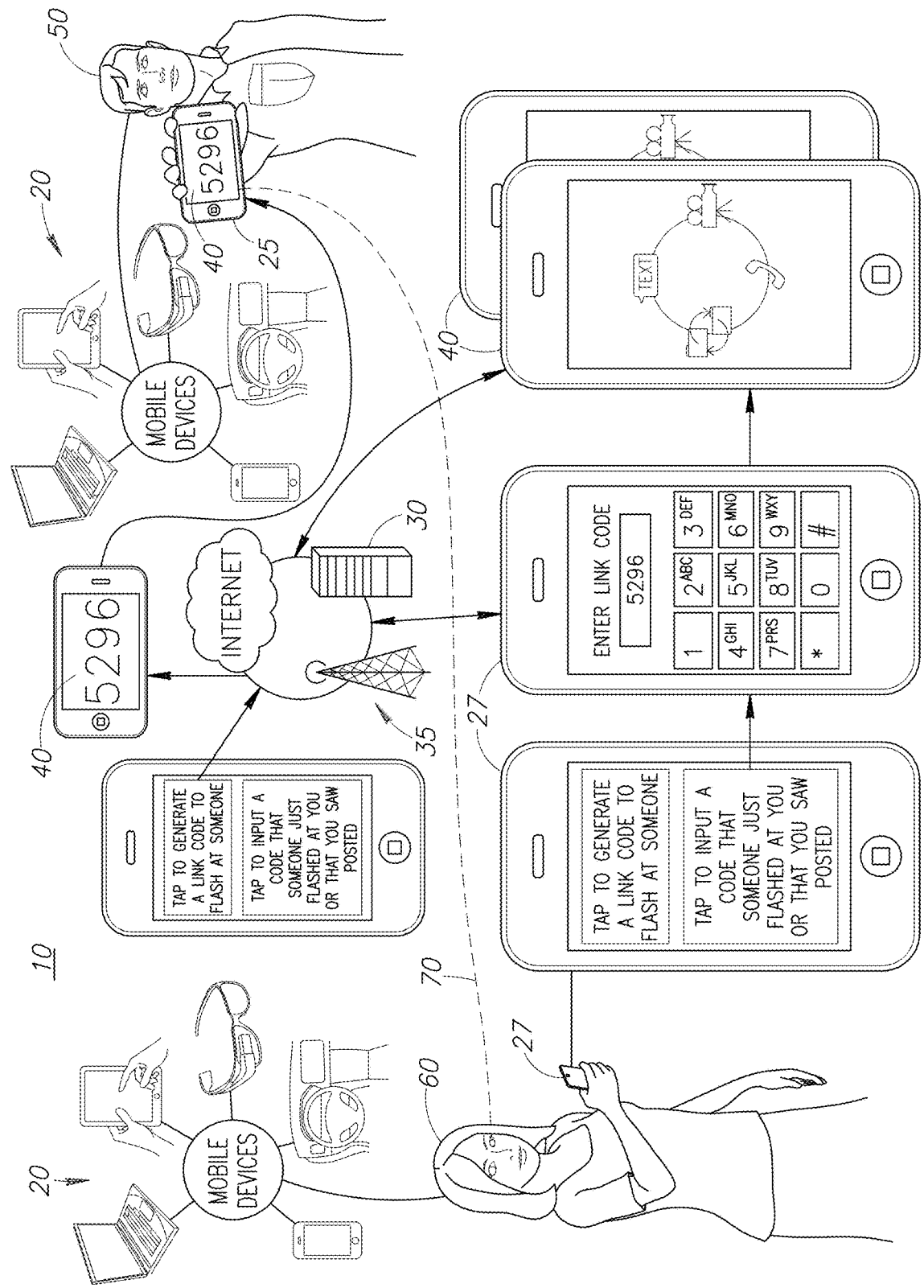
FIG. 1 illustrates an overview of one embodiment of the invention.
Figure 2:
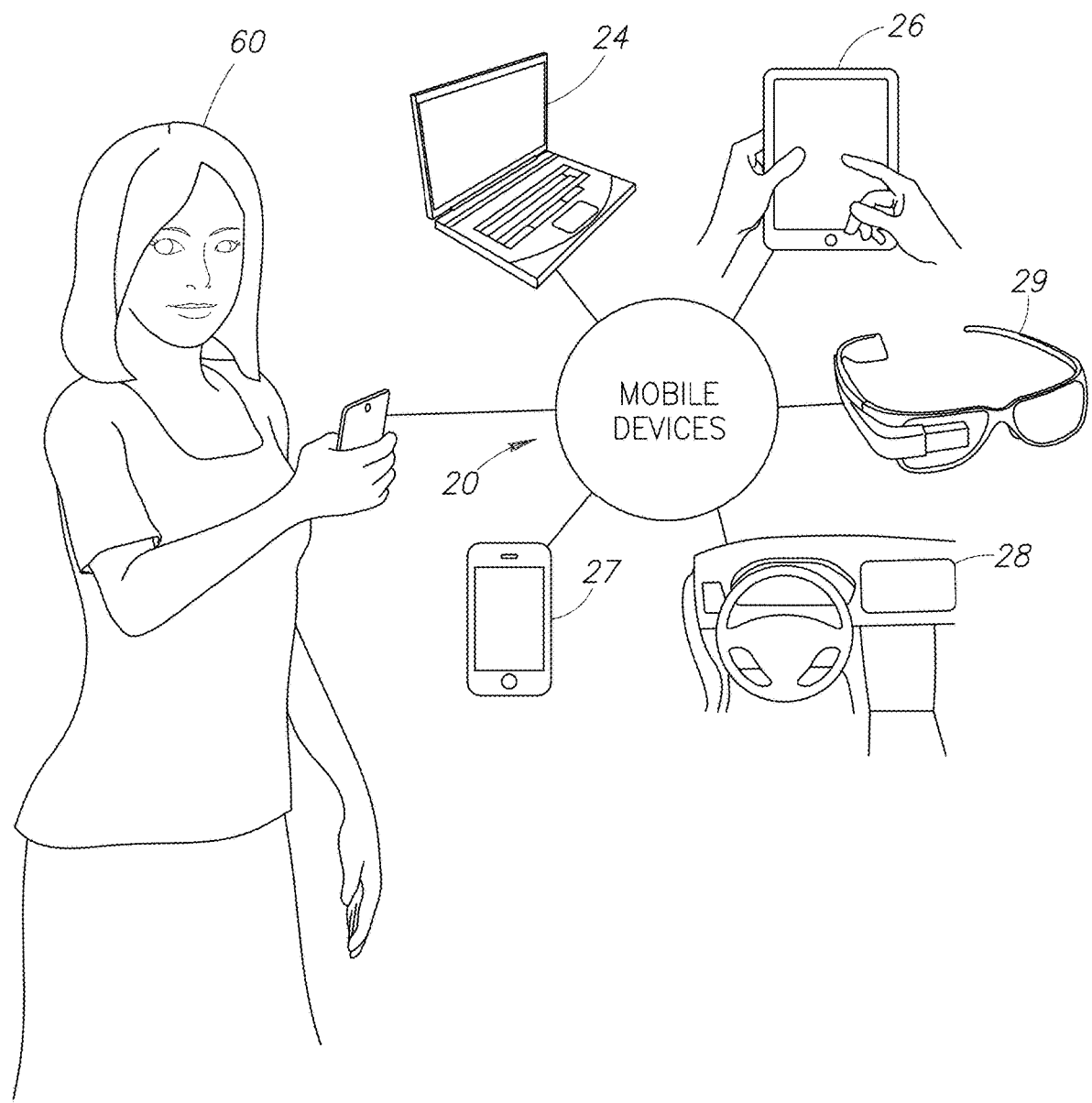
FIG. 2 illustrates examples of the mobile devices used with embodiments of the invention.

FIGS. 1 and 2 illustrate a networking system 10 in accordance with a preferred embodiment of the present invention. Networking system 10 utilizes a mobile device 20 (such as a mobile phone 27, computer 24, tablet 26, vehicle's dashboard computer 28, or mobile glasses 29 such as Google® Glass) which communicates through a host server 30 that identifies the location of a user's device 25 and allows the users to easily connect anonymously on their mobile devices over a data network 35 (for example, but not limited to: 3G, 4G, and Wi-Fi) through the host server 30 with other people, strangers, businesses, websites and informational pages by simply inputting or saying out loud a short code into their mobile device (instead of a phone number or website address) when the user is within a certain radius of the code they see posted and/or advertised, or, by way of example, flashed at them by another user. In accordance with a preferred embodiment, operations and communication between devices and users is preferably implemented through an application downloaded onto the users' device(s). In another embodiment, the implementation may, for example, be supported by the browsers on the users' device(s). The invention not only connects people anonymously with one another, but it also provides a method for people to get information or get to a website using a short code instead of long a URL (Uniform Resource Locator, also known as a web address).

As further illustrated in FIG. 1, a user 50 on a mobile device 25 (user 1) can link to and anonymously chat with or exchange files with another person 60 (user 2) after the application and host server 30 generates a short, preferably visually large-sized code 40 for user 50 to display on their mobile device 25. The user 50 can flash that code 40 at user 60 to see and input or dictate into their mobile device 27. After user 60 inputs the code flashed at them by user 50, the two users become paired to each other through the host server 30, and the users 50, 60 can chat anonymously and/or exchange files (pictures, contact cards, info cards, web links, etc.) without either party having to reveal their phone number or email address to the other user. After being paired, users 50, 60 can chat with each other on their mobile devices 20 by voice, text or video chat, as well as exchange files (i.e., pictures, videos, links, and the like) through the host server 30 until one of the two users decides to break the paired link.

Additionally, a user 50, 60 could use, for example, the same application or browser on their mobile device 20 to connect to a website, advertisement, or data page, and/or get information by simply inputting or dictating a short code into the application installed on their mobile device instead of having to input a long URL website address.

Figure 3D:
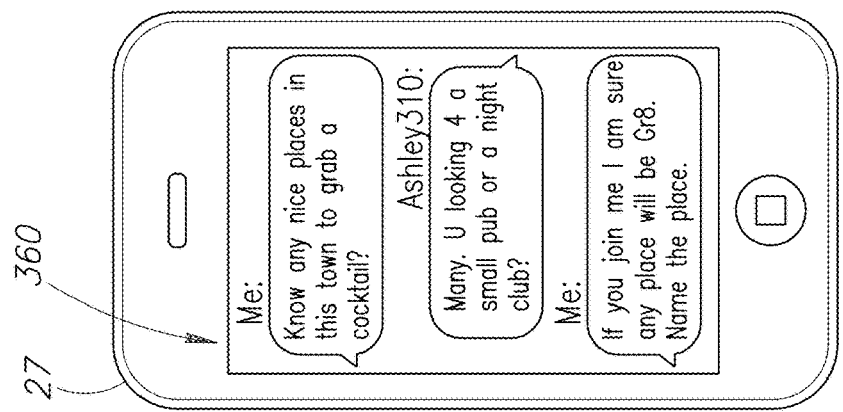
FIGS. 3A-3D illustrates additional embodiments of the invention.
Figure 3C:
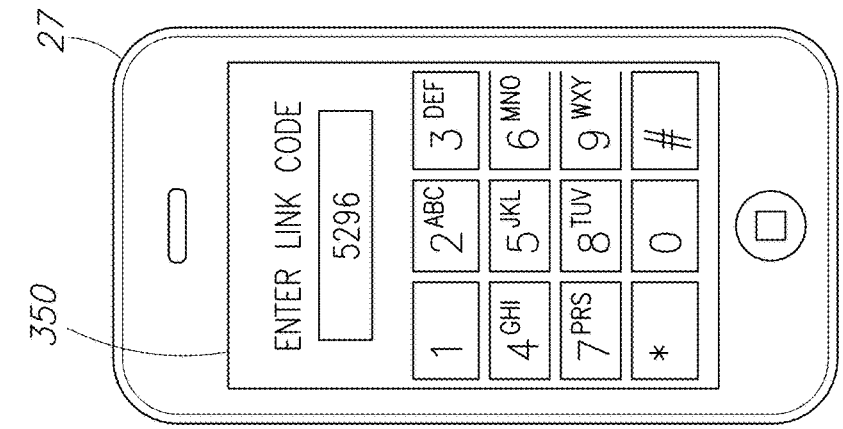
Figure 3B:
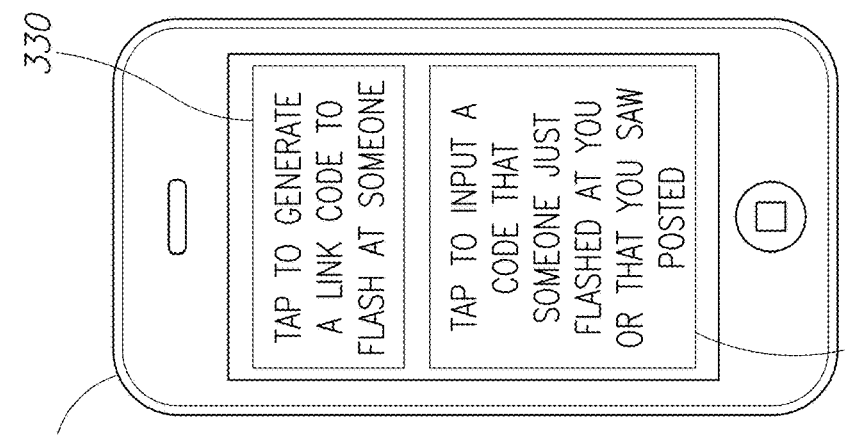
Figure 3A:
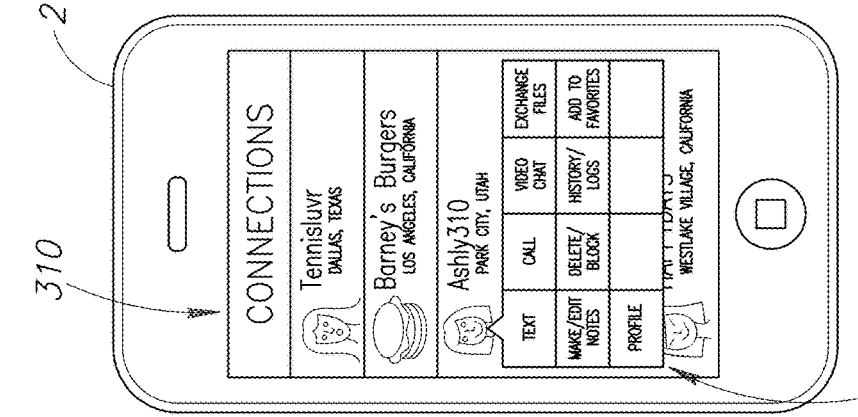

FIGS. 3A-3D illustrate various aspects of a user interface according to a preferred embodiment of the present invention. FIG. 3A represents a user's contact list or phonebook 310 on a mobile device 20 and further depicts various possible activities or actions 320 that the user 50, 60 may select with the different contacts in the phonebook. For example, for contact "Ashley310", the user 50, 60 could select operations such as call, text, video chat, exchange files, etc.

FIG. 3B illustrates a screen that provides a user 50, 60 the choice to either generate a link code or enter a link code that someone else generated or posted. If the user wishes to generate a link code, she/he taps generate window 330. If the user wishes to input a link code created by someone else, she/he may tap input window 340 and create the appropriate link. FIG. 3C shows an input screen 350 on mobile phone 27 that someone would enter a link code, if for example, the user tapped input window 340 (FIG. 3B). In this example, the user entered link code "5296".

FIG. 3D is an illustrative example of a text conversation 360 between users 50, 60 as might appear on user's mobile phone 27 as a result of being linked according to the present invention.

Figure 5A:
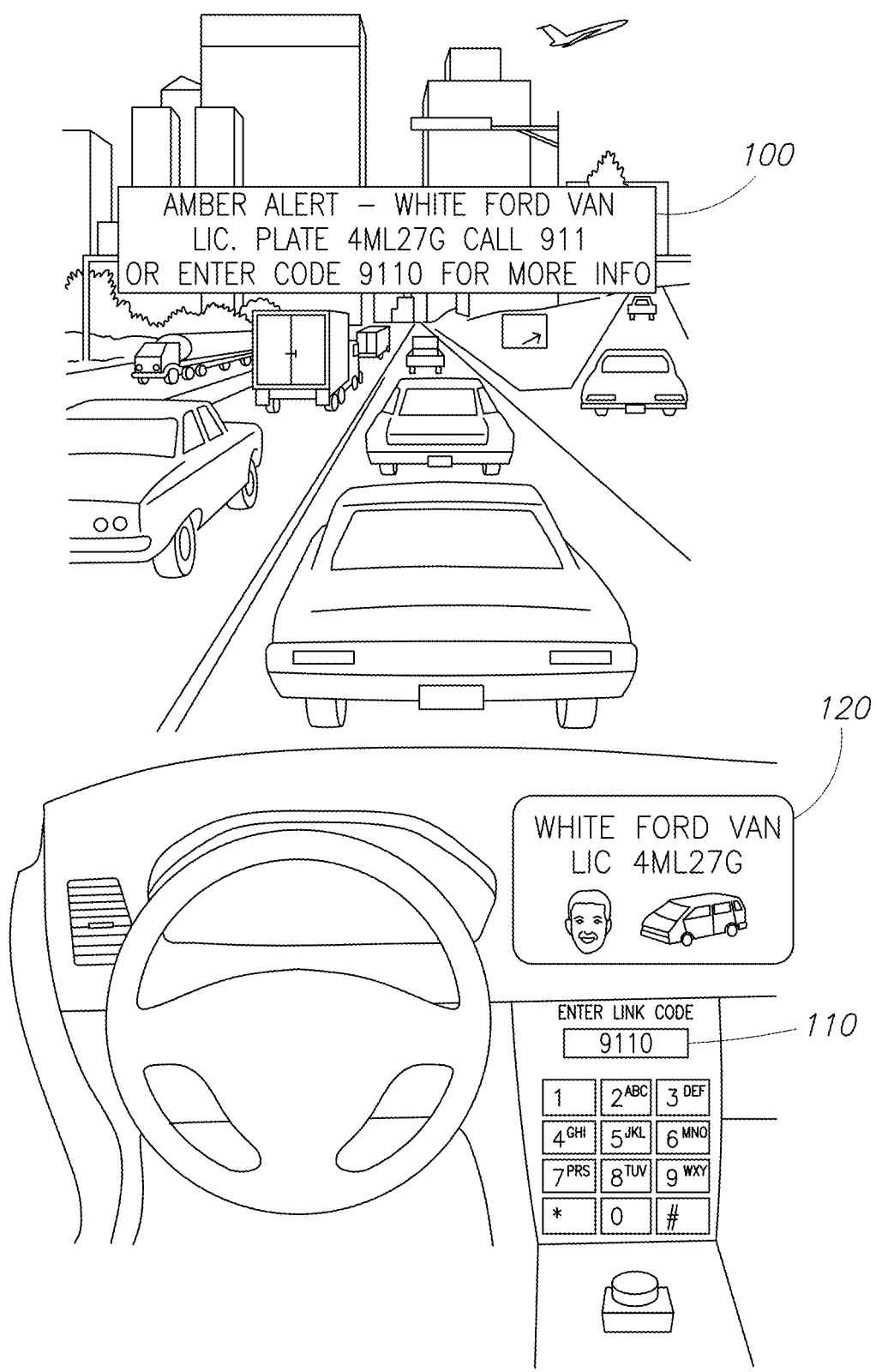
FIG. 5A shows an additional embodiment of the invention.

Examples of information sent to the user's mobile device 20 after the user inputs a short code that the user sees displayed or advertised include, but are not limited to:

[a] AMBER ALERTS. More detailed information about an AMBER Alert displayed on, for example, a digital highway bulletin board 100. A user can input the code 110 displayed and receive a picture of the make and model car to look for and/or a picture of the suspect and/or child could be displayed on the user's mobile device 20 or automobile dashboard computer 120. (One example of this embodiment of the invention is shown in FIG. 5A).

Figure 5B:
FIG. 5B shows an additional embodiment of the invention.

[b] REAL ESTATE LISTINGS. The details of a property 200 advertised so the user 50, 60 can see the asking price, pictures, size of the property, and agent information after entering the code 220 displayed on the "For Sale" sign 210 on the property. (One example of this embodiment of the invention is shown in FIG. 5B).

[c] MENUS. The menu of a restaurant advertised on a billboard.

[d] PARKING. Parking space availability and rates of nearby parking lots.

Preferred embodiments of the invention include both personal and commercial applications. The personal application is how certain embodiments of the invention allow people to spontaneously connect with, interact with, and exchange files with nearby people (such as a stranger) through the host server using their mobile devices without having to reveal their identity, mobile phone number or email address.

In one embodiment of the invention, a user sitting in the back of one cab would like to chat with someone they notice sitting in the back of an adjacent cab. The user taps the icon on the Application of their mobile device which generates a large code on his device's display. The user can hold up their mobile device for the other person to see. Once the other person sees the code, they can input that code into the application of their mobile device. The two are then paired through the host server and can begin chatting with each other without either party having revealed their phone number or email address.

In another embodiment of the invention, two strangers, a guy and a girl, are at a club and begin chatting with each other. The girl needs to leave the club but she would like to continue chatting with the guy again later that night, however she does not want to give her phone number to this guy who she just met. Instead, the host server generates a short code on her phone and she shows it to the guy. He then inputs the code into his phone and the two are paired through the host server. They are both now able to contact each other at a later date without having to exchange phone numbers or email addresses.

In yet another embodiment of the invention, a guy and a girl who have never met each other are at a party. The girl takes a picture with her phone that the guy would like a copy of. He asks the girl to please send him a copy of the picture. If the girl sends him a copy of the picture via traditional methods (i.e., email or SMS messaging), the guy will see her email address or mobile phone number when he receives the picture. In this embodiment of the invention, she is able to generate a code on her phone for the guy to input into his phone. Once paired through the server, she can send him a copy of the picture he wanted without revealing her phone number or email address and the guy was able to receive the picture without having to reveal his email address or phone number.

In yet another embodiment of the invention, a woman is home alone and hears a knock at her door. She looks through the peephole and sees that it is a solicitor, a vacuum salesman. She is scared to open the door to a stranger, so she generates a code on her cell phone and tells the solicitor to enter the code on his mobile device. After the two are paired, the salesman speaks with her over the phone and sends her pictures and a link to the website of the vacuum he is selling.

In yet further aspects of the invention, people and businesses can advertise a short code instead of a website address which the user can input into their mobile device instead of having to input a long URL into their mobile device's internet browser, making it easier, faster and significantly more convenient for the user. Entering a long URL into the internet browser on a mobile device can be difficult and time consuming, especially on mobile phones that have small keyboards; or, for example, on a vehicle's dashboard computer, which may not even have a keyboard. If, for example, a person is driving and sees an advertisement displayed on a billboard, entering a website address into their vehicle's onboard computer would be difficult as well as dangerous while driving. The present invention would allow the user to quickly enter a short code into their vehicle's dashboard computer almost as quickly as changing the radio station, or the user will be able to verbally speak the code out loud without ever having to take their eyes off the road and then have information displayed on their vehicle's dashboard such as details about an AMBER Alert (i.e., a picture of the suspect or a picture of the make and model car to be on the lookout for).

The present invention makes great use of location-based technology which identifies the geographical location of the user's mobile device using technology such as, but not limited to: GPS, Cellular Triangulation, Forward Link Timing or Crowdsourced Wi-Fi data. By utilizing the user's mobile device location, the same short codes can be repeated and utilized in different areas at the same time to initiate paired links. Therefore a user in one area inputting a code will link to a different device, website or information page than another user who inputs that same code in a different area. For example, User "A" is standing in front of a house (House "A") that has a stationary code of "H1234" posted on the "For Sale" sign. When User "A" inputs that stationary code "H1234" into their mobile device, pictures and information about House "A" will show up on the display of User A's mobile device. At the same time, a different user (User "B") standing in front of a different house two miles away (House "B") sees the same stationary code of "H1234" posted on the "For Sale" sign of House "B". When User "B" inputs the stationary code "H1234" on their mobile device, pictures and information about House B will be displayed on their device. Even though both users (User "A" and User "B") inputted the same stationary code of "H1234" into their mobile devices, each user received different results since User "A" was in a different location than User "B".

Figure 4:
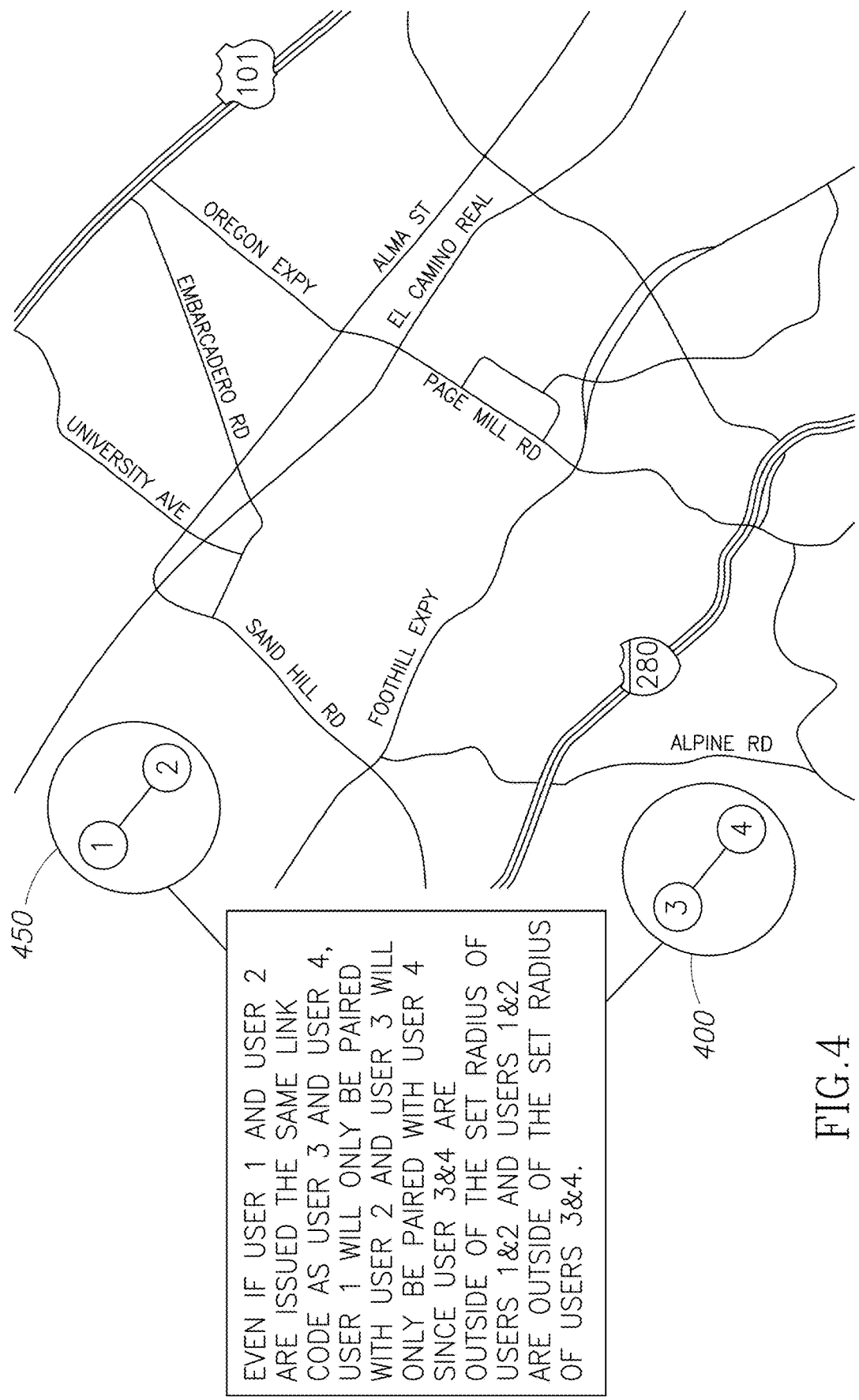
FIG. 4 shows a map of yet another embodiment of the invention.

In accordance with a preferred embodiment of the invention, and as further illustrated in FIG. 4, temporary non-stationary codes can be infinitely recycled after they are used to create the initial paired link, or after they expire. For example, User 1 requests a code on his mobile device that he can flash at User 2. The host server generates and issues the code "3456" to User 1 which is then largely displayed on User 1's mobile device so he can hold it up for User 2 to see and input into their (User 2's) mobile device. At the same time, another user (User 3), who is located on the other side of town, requests a code on her mobile device and the host server generates the same code "3456" for her to flash at User 4 to see and input into their (User 4's) mobile device. In this situation, User 3 and User 4 will be paired together 400 through the host server and can begin chatting or exchanging files with each other and User 1 and User 2 will be paired together 450 though the host server and can begin chatting and exchanging files with each other through the host server on their devices. Even though User 4 inputted the same code of "3456" into their mobile device as User 2 inputted into their mobile device, User 4 was not paired with User 1 because User 4 was not within the set radius of User 1, however User 4 was able to pair with User 3 since they were within the set radius of User 3. The two users will stay paired until either of the paired users decides to purposely break the paired link between them. Since the codes will only be used to create the initial link to pair the users, the code will no longer be needed by the users after they have been paired. Therefore once a temporary non-stationary code is used in an area as just described (or once the code expires if it is not used within a set period of time such as 5 minutes), the same code can then be recycled and used in the same area again for other users to pair with each other.

Preferably, the first time a user installs the application on their mobile device they will be prompted to create an account and set up a user profile (which will preferably include at the very least a unique username and password or other authentication credentials, and additional information if they so choose, such as a profile picture or avatar, relationship status, city of residence, etc.), all of which can be stored on the host server. The host server can also store, for example, some or all of the user's paired contacts associated with their account, chat history, and the like. Once a user has been paired with another user they can continue chatting or exchanging files with each other at any time. Since the paired link between the users is immediately stored, preferably on the host server or servers or in the cloud or other database(s) after the users have been paired, the users stay paired even after they travel away from each other outside of the set radius or after they power cycle their devices off/on. Users can install the application on multiple devices. From any of the user's devices or from any computer with an internet connection, the user will be able to log into their account, chat with and exchange files with their paired contacts, delete contacts (which typically breaks or otherwise inactivates the paired link so neither party can contact the other through the host server until a new paired link is created or reactivated again) or edit their profile and/or account settings. The contacts folder in the application containing some or all of the user's paired connections can be located in a separate contacts folder from their mobile device's native contacts folder or address book.

In one embodiment of the invention, the contacts folder of the application can include, but is not limited to:

(a) The contact's username and a photo or avatar of the contact;
(b) Information about the contact such as their city of residence, the current time in the time zone the contact listed as their city of residence, the current weather where the contact listed as their city of residence, and the like;
(c) Other information about the contact, including, but not limited to: relationship status, hobbies, posts, pictures or videos posted by the contact, user-defined tags, occupation, place of employment, likes/dislikes. For commercial contacts, information can include, but is not limited to: Address, phone numbers, website address or other links, coupons or discount offers, opt in/out checkbox for receiving emails, coupons and announcements, etc. from the contact/business, notes, and other information;
(d) A "Favorites" button to tag favorite contacts;
(e) A Notes section for each contact so the user can make individual notes about each contact in the contact's record;
(f) A history log showing past chats with each contact.
(g) A delete icon which deletes the contact and breaks the paired link for that contact (a symbol on the other user's devices(s) will denote that they are no longer paired and that a new link must be recreated); and
(e) Icons to enable call, text, video chat and/or exchange files or information with the contact.

Additional features of embodiments of the invention include, but are not limited to:

(a) The user can have the ability to create a paired connection/link by inputting the unique username of the contact instead of a link code. This may be especially advantageous for users who want to pair when they are in areas (such as indoors) where the users' location(s) cannot be ascertained;
(b) The ability to pair users by touching (bumping) their mobile devices together using technologies such as Bump, S-Beam, NFC or similar technologies;
(c) The ability to enter link codes by scanning a barcode or any other electronic scanning/transmitting or beaming system or technology to, for example, pair users or go to a web site;
(d) The ability to password protect some or all of the user's data.

While preferred and alternative embodiments of the invention have been illustrated and described, as noted above, many changes can be made without departing from the spirit and scope of the invention. Accordingly, the scope of the invention is not limited by the disclosure of the preferred embodiment. Instead, certain embodiments of the invention should be determined entirely by reference to the claims that follow.

Certain embodiments of the invention in which an exclusive property or privilege is claimed are defined as follows:

I claim:
1. A computerized method, comprising:
connecting a first mobile device over a data network to a host server, wherein the first mobile device is operated by a first user;
ascertaining a location of the first mobile device via the host server;
connecting a second mobile device over a data network to a host server, wherein the second mobile device is operated by a second user;
ascertaining a location of the second mobile device via the host server;
receiving at the host server a request from the first mobile device for a pairing code that is discernible by a human;
receiving the pairing code generated by the host server, at the first mobile device, and displaying the pairing code on a display of the first mobile device, and wherein the pairing code is configured to be visually conveyed, by the first user, to the second user in a manner in which the second user can discern the pairing code and can enter, manually, the pairing code into the second mobile device via a keypad or by voice;
calculating, via the host server, a distance between the locations of the first and the second mobile devices;
verifying that the second mobile device was located within a first set radius of the first mobile device at the time the pairing code was generated by the host server;
connecting, only if verified, the first and second mobile devices to communicate;

sending a communication between the first and the second users associated with the first and second mobile devices via the data network to inform the first and second users that the first and second mobile devices are successfully linked; and at the same time as the receiving of the pairing code at the first mobile device, using the pairing code in conjunction with connecting to communicate, a third mobile device and a fourth mobile device located with a second set radius from the third mobile device, wherein the second set radius does not overlap the first set radius.

2. The computerized method of claim 1, wherein the microprocessor-controlled apparatus comprises a mobile device.

3. The computerized method of claim 1, wherein the microprocessor-controlled apparatus includes at least one of a mobile phone, a digital music player, a tablet computer, a vehicle dashboard computer, and a computerized mobile eyewear device.

4. The computerized method of claim 1, wherein the code includes a keyboard entry.

5. The computerized method of claim 1, wherein conveying the code includes conveying alphanumeric symbols.

6. The computerized method of claim 1, wherein conveying the code includes conveying a sequence of alphanumeric symbols.

7. The computerized method of claim 1, wherein the code includes at least one of a microprocessor-controlled apparatus provided code and an external provided code.

8. The computerized method of claim 1, wherein the set distance limit comprises a geofence, and further wherein the geofence is controllable by a user.

9. The computerized method of claim 1, wherein receiving the information includes one or more of the following items of information: text, audio, files, web links, and video information.

10. The computerized method of claim 1, wherein the code includes a vocal command.

11. A computerized method, comprising:
 connecting a first mobile device over a data network to a host server, wherein the first mobile device is operated by a first user;
 ascertaining a location of the first mobile device via the host server;
 connecting a second mobile device over a data network to a host server, wherein the second mobile device is operated by a second user;
 ascertaining a location of the second mobile device via the host server;
 initiating a request for a pairing code that is discernable by a human by the first user tapping a corresponding icon displayed by the first mobile device;
 receiving at the host server the request for a pairing code from the first mobile device;
 receiving the pairing code, generated by the host server, at the first mobile device, and displaying the pairing code on a display of the first mobile device, and wherein the pairing code is configured to be visually conveyed, by the first mobile device, to the second user in a manner in which the second user can discern the pairing code and can enter, manually, the pairing code into the second mobile device via a keypad or by voice;
 receiving at the host server, from the second mobile device, the pairing code entered into the second mobile device by the second user;
 calculating, via the host server, a distance between the locations of the first and the second mobile devices;
 verifying that the second mobile device was located within a first set distance limit from the first mobile device at the time the pairing code was generated by the host server;
 connecting, only if verified, the first and second mobile devices to communicate;
 sending a communication between the first and the second users associated with the first and second mobile devices via the data network to let the first and second users know that they are successfully linked; and
 at the same time as the receiving of the pairing code at the first mobile device, using the same pairing code in conjunction with connecting, to communicate, a third mobile device and a fourth mobile device each located beyond the first set distance limit from the first mobile device and from the second mobile device, the fourth mobile device located within a second distance limit from the third mobile device, the first mobile device and the second mobile device each located beyond the second set distance limit from the third and fourth mobile devices.

* * * * *